Aug. 17, 1943.  C. H. PHELPS  2,326,884
GAS ANALYZER
Filed Nov. 28, 1941
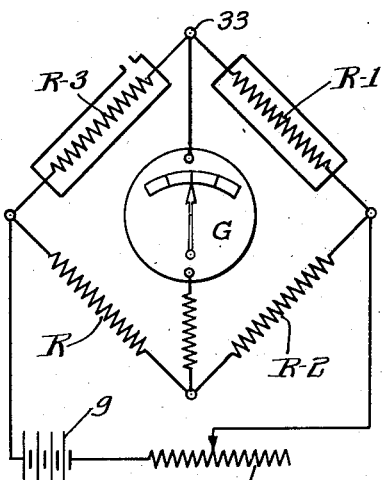
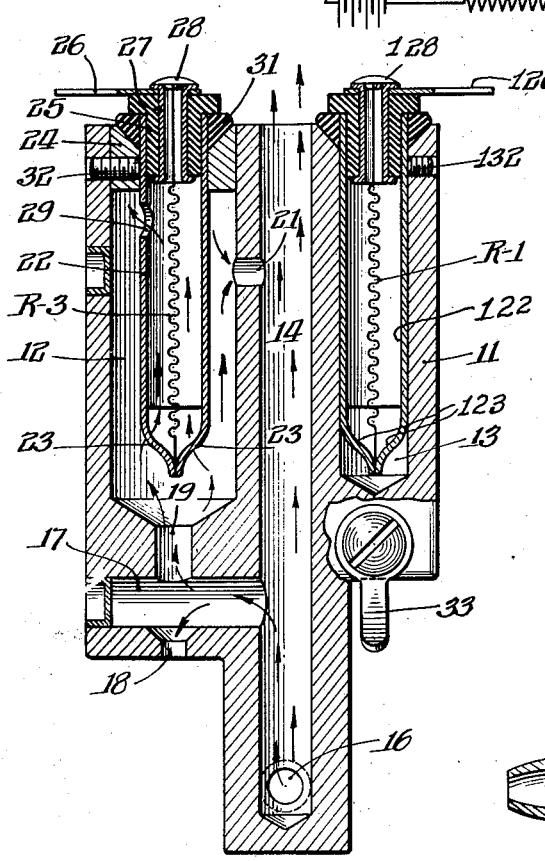
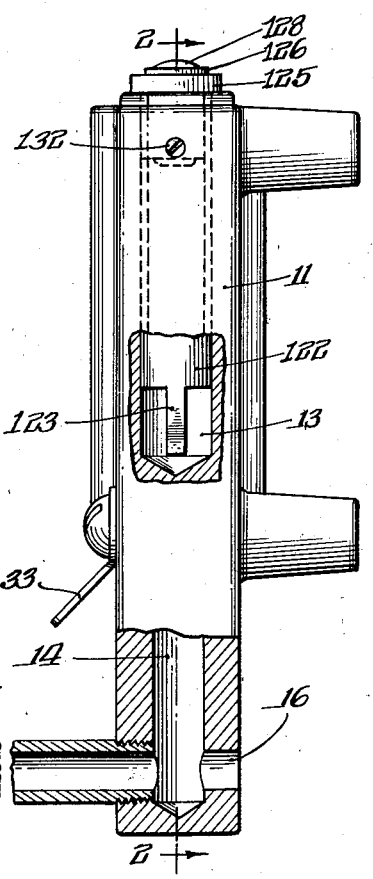
INVENTOR.
Clyde H. Phelps
BY Walter M. Fuller, atty.

Patented Aug. 17, 1943

2,326,884

UNITED STATES PATENT OFFICE 2,326,884

GAS ANALYZER

Clyde H. Phelps, Springfield, Ill., assignor to Weaver Manufacturing Company, Springfield, Ill., a corporation of Illinois Application November 28, 1941, Serial No. 420,849

8 Claims. (Cl. 73—51)

The present invention relates to certain features of betterment and refinement, both structural and functional, in appliances, incorporating the known thermal-conductivity principles, for testing the composition of gases, such as the exhaust-gases of internal-combustion engines.

Such procedure has been known and practiced for some time more or less extensively and has been generally characterized as the electrical method, by means of which the carbon-dioxide content of flue-gas, internal-combustion engine exhaust-gas, or the like is rapidly analyzed to afford a reliable indication of the completeness of the combustion which results in such gas mixture.

The specified process employs an electric-current to heat one or more resistance-units in the electric-circuit, one of which units is enclosed in a suitable chamber into which the gas to be investigated is introduced in a manner to surround the heated unit, the temperature or the resistance, or both, of the current-heated resistance-element varying according to the thermal-conductivity of the surrounding gas.

When two such heated resistance-units are incorporated in a suitable circuit, such as a Wheatstone-bridge system, with two arms of the bridge including the heated resistance-units enclosed in suitable chambers whereby the gas to be analyzed can be passed through one of the chambers and a standard or comparison gas contained in, or passed through the other chamber, a continuous indication of the relative thermal-conductivity of the two gases may be obtained, but in such systems some means must be employed to restrict the flow of gas or actually entrap it to prevent overcooling of the heated resistance, due to the flow of the gas.

Again, as most exhaust-gas and flue-gas streams have a high water-vapor content, this, when condensed within either or both of the above-mentioned chambers and mixed with some gas, may form objectionable conducting or corrosive compounds that have a destructive action upon the resistance-units themselves as well as an effect on the reliability of the readings obtained on the electrical-instrument employed.

The current invention involves a simple and effective method and means for passing the gas sample to be examined through the analyzing-chamber at a slow rate, whereby undue cooling of the resistance-unit due to flow, is of substantially zero effect, and means are also provided for free drainage of any condensed water-vapor in such a manner that the resistance-units are in a relatively dry position and are continually dried due to the heat therein.

The resistance-units are novel in construction and relatively inexpensive to produce and, since they are of a self-contained type, they may be readily removed and replaced in the chambers referred to above without the return of the instrument to the factory for renewal.

To enable those acquainted with, or skilled in, this art to understand this invention, a current preferred embodiment thereof has been illustrated in detail in the accompanying drawing forming a part of this specification and to which reference should be had in connection with the following description, and, for simplicity, like reference characters have been employed throughout the several views to indicate the same members.

In the views of this drawing:

Figure 1 presents the known Wheatstone-bridge circuit in which the appliance is used;

Figure 2 is a vertical, central section through the device;

Figure 3 is an edge view of the same partly in section.

Referring to the views of the drawing, Figure 1 illustrates the electric-circuit arrangement in which the appliance of this invention is incorporated and which device houses the two resistances R—1 and R—3, such figure portraying the usual four resistances R, R—1, R—2 and R—3, the customary properly-graduated galvanometer G being bridged across the system as shown and the usual battery 9 and adjustable rheostat 10 being employed in the relation indicated.

The particular apparatus embodying this invention includes a metal body 11 desirably integral throughout and preferably one of high heat-conductivity, such as aluminum or the like, this body having two, upright, parallel, cylindrical chambers, a large-diameter and slightly-longer one 12 and a lesser-caliber and smaller one 13, both open at their upper ends.

By making the member 11 of such a type of metal, the walls of its two chambers are at all times maintained at substantially the same temperature.

Between these parallel chambers is a vertical flue or passage 14 open to the atmosphere at its top end, its lower portion being connected laterally to an inlet-pipe 15 adapted to be joined by a hose or comparable connection, for example, to the exhaust-pipe of the automobile whose gas is to be examined.

Directly opposite pipe 15 passage 14 has a lateral exhaust-port 16 delivering directly into the external atmosphere.

Part way up flue 14 it connects with a side passage 17, the latter having through its lower wall a vertical port 18 communicating with the outer air, and having through its upper wall a port 19, in vertical register with the lower port 18, opening upwardly through the center of the bottom wall of chamber 12, the top surface of such chamber wall converging downwardly conically to such port.

In addition, the inner side-wall of chamber 12 has a port 21 connecting such chamber with the upper portion of the erect passage or vent 14.

The electrical-resistance unit R—3 is housed in an upright, cylindrical, copper or other electrically-conductive tube 22 in alignment or register with the ports or holes 18, 19, the lower end of such tube being open except for a narrow, arched bridge across the opening composed of a pair of strips 23, 23 of the tube bent together and soldered together at their ends.

A metal bushing 24 with a concave or conical top surface is snugly and permanently fitted in the top end of chamber 12 and the opening through such bushing accommodates the upper portion of the tube 22, the latter being fitted internally with an insulation-sleeve 25 having an enlarged, top head which directly overlies and extends outwardly beyond the adjacent end of the tube.

Above such head is an apertured electric-terminal 26, a hollow or tubular metallic-rivet 27 extending through the holes of such sleeve and terminal and securely binding them together.

The resistance-element R—3 is connected at its lower end to the bridge 23, 23 across the bottom open end of the tube and is joined at its upper end to the rivet 27 as by attachment to a cap 28 soldered to and closing the passage through the rivet.

Insofar as already described, the resistance R—1 is similarly mounted in the smaller chamber 13 in which the tube 122, containing the resistance-wire, more or less snugly fits in the chamber in contact with its cylindrical wall, but, in this case, no bushing comparable to that designated 24 is used, the top surface of the body 11 being formed conically around the tube as shown.

Tube 122 has its individual elements 123, 125, 126, 127, 128, 131 and 132 corresponding to the parts 23, 25, 26, 27, 28, 31 and 32 associated with the tube 22.

Tube 22 accommodating the resistance R—3 has a hole or port 29 through its side-wall just below the bushing 24, it being understood, as is clearly illustrated, that the chamber or compartment 12 is of such caliber as to provide an annular space around the tube.

Each of the two resistance-encasing tubes near its top end is provided with an external, surrounding, rubber conical-gasket 31 coacting with the companion, conical surface of the bushing 24, or of the main body 11, as the case may be, to seal the chambers against the escape of gas.

From what precedes, it is apparent that either resistance-assembly as a whole may be readily removed from its chamber, if necessary, and a new like structure slipped into its place, and, in order that such assembly may not be unintentionally displaced, it is demountably held in position in its chamber by a set-screw 32 which allows its easy removal when desired.

In order that the two resistances may be connected in the circuit in parallel relation, the main body 11, with which they are both in electrical association is supplied with a third terminal 33.

Assuming that the appliance is inserted in the electric-circuit in the manner shown in Figure 1, the two resistances R—1 and R—3 are heated by the electric-current from the battery passing through them in series relation, thus assuring that the same strength of current flows through both and tends to heat them in the same degree.

As the gas-mixture to be analyzed or tested enters the lower part of the flue or passage 14 through the admission-pipe 15, a portion of the mixture is immediately discharged to the atmosphere through the port 16 and the remainder flows up the passage 15 by reason of its heat rather than by a pressure otherwise produced.

A part of such ascending gas enters the lateral passage 17 and a portion of such gas escapes to the atmosphere through passage 18, the remainder entering the lower end of chamber 16 through port 19.

From here the gas flows through two paths in parallel relation, one being up around the tube 22 and out into passage 14 through port 21, and the other up through the tube and around the resistance-wire and out through port 29 and into passage 14 through port 21, all of the gas ultimately flowing out the open top of message 14 into the outside atmosphere.

Any condensed moisture in the gas in the passage 17 or in the chamber 12 or in the tube 22 automatically drains out through port 18 so that it has no detrimental effect on the resistance-wire or on the readings of the galvanometer.

Also any liquified moisture in flue 14 is similarly discharged from the device through port 16.

The flow of the gas undergoing test between the resistance-wire R—3 and the tube 22 and intermediate the latter and the wall of the chamber 12 is such that it produces no undesirable effect in the procedure, in that the pressure of the waste gas from the internal-combustion engine, for example, is sufficiently released through the indicated exhaust-ports of the appliance to accomplish that important result.

Again, the manner of automatically shunting a portion of the gas undergoing examination through the chamber 12 and tube 22 from the main body of gas ascending in the passage 14 and returning it to such passage in part at least by the effect of the gas in its ascent in such passage assures such a flow in the chamber as to avoid any material cooling effect on the resistance-wire due to the gas flow, but, of course, the heat of the gas, as distinguished from the effects of its flow, causes a comparable change in the resistance of part R—3.

The closed chamber 13 and its tube are filled with air or a standard or reference gas, and the different effects of the two gases in the two chambers on their two resistances are shown on the galvanometer, which may be so graduated as to indicate the amount or percentage of carbon-dioxide in the mixture undergoing test.

The outstanding features of this invention are: (a) the controlled flow of the gas under examination through that chamber in which the traveling gas surrounds the resistance-wire; (b) the means provided for the prompt and efficient discharge of the condensed-moisture so that it may not effect the readings nor combine with other elements to result in a corrosive medium; and (c)

the ease of replacement of the resistance-assemblies.

Although not necessarily essential to the satisfactory and efficient operation of this novel apparatus, the resistance R—I may be of a metal or other material which has very low change in resistance with modifications in its temperature, whereas the resistance R—3 may be composed of a metal or the like having a relatively high coefficient of resistance change with temperature variations.

The invention as defined by the appended claims is not necessarily limited and restricted to the precise and exact details of structure shown and described because these are subject to modification without departure from the heart and essence of the invention and without the loss or sacrifice of any of its material benefits or advantages.

I claim:

1. In an electrical single-resistance assembly for ready insertion in and removal from a chamber of a metallic-body of a gas-analyzer, said chamber having an open cylindrical mouth, the novel combination of a single round metallic-tube open at one end and closed at its opposite end and of a diameter substantially the same as that of said mouth, an electric-terminal at said closed end of, and insulated from, said tube, a single resistance-element of a length equal at least to the major length of said tube and disposed lengthwise in said tube and having one end only thereof in electrical-connection with said tube and having its other end in electrical-connection with said electric-terminal, said tube being adapted to be slid longitudinally through said mouth into place in said metallic-body chamber and in electrical-contact with said body at said mouth and to have its closed end fitting in and closing said otherwise open-mouth of said chamber.

2. The novel combination in an electrical resistance-assembly as set forth in claim 1, in which said tube has a side-port therethrough adjacent to and inwardly of said closed end of the tube, and in which said electrical-connection of said resistance-element with said tube comprises a part of the tube extending as a bridge across the open end of the tube with the resistance-element connected to said bridge.

3. The novel combination in an electrical resistance-assembly as set forth in claim 1, in which said closed end of said tube is surrounded by a sealing-gasket, and in which said electrical-connection of said resistance-element with said tube comprises a part of the tube extending as a bridge across the open end of the tube with the resistance-element connected to said bridge.

4. The combination of novel features in an electrical resistance-assembly as set forth in claim 1, in which the closure for said closed end of said tube includes an insulation-sleeve fitted in said end of the tube, a hollow-rivet extended through the aperture of said sleeve, and means closing the opening through said rivet, the corresponding end of said resistance-element being secured to said rivet-opening closing-means, said terminal being clamped between the outer head of said rivet and the outer end of said insulation-sleeve.

5. The combination of novel features in an electrical-resistance-assembly as set forth in claim 1, in which the closure for said closed end of said tube includes an insulation-sleeve fitted in said end of the tube and has an external-head overlapping the end of said tube, a hollow-rivet extended through the aperture of said sleeve and in electrical-connection with said terminal and fastening said terminal to said sleeve-head, means closing the opening through said rivet, and a gasket surrounding the closed end of said tube, the head of said sleeve also overlapping said gasket, the end of said resistance-element being connected to said rivet-opening closing-means.

6. In a gas-analyzer having a metallic main-body provided with two chambers, the first of which is closed with a reference-gas therein, and the second of which is an upward chamber having means for the passage therethrough of the gas to be tested, an electrical-resistance in each of said chambers, an electric-circuit including said resistances, and an electrically-actuated indicator in said circuit, the novel combination of features being that said main-body has a main upward flue open at its top to the external atmosphere, a first gas inlet-port communicating with the lower portion of said flue laterally of the latter, said means for passage of the gas to be tested through said second chamber including a lateral passage connected to the lower portion of said flue, a second port connecting said lateral passage to the bottom portion of said second chamber to admit gas thereinto and to provide drainage therefrom, a third port connecting an upper portion of said second chamber to said flue above the level of said lateral passage connection therewith, and a fourth exhaust-port connecting the lower portion of said flue laterally of the latter to the external atmosphere, said first and fourth ports providing a reduced gas-flow up through said flue by reason of their lateral position and due to the discharge of a portion of the gas to the external atmosphere before the gas reaches said lateral passage.

7. The novel combination of features in gas-analyzers set forth in claim 6 in which said lateral passage has a fifth downwardly-directed drainage port to the external-atmosphere.

8. The novel features in gas-analyzers set forth in claim 6 in which said lateral passage has a fifth downwardly-directed drainage-port in substantial vertical register with said second port so that any liquid in said second chamber will be discharged into the atmosphere.

CLYDE H. PHELPS.